Dec. 7, 1937.   C. W. RICE   2,101,197
TREATMENT OF BOILER WATER
Filed May 11, 1935
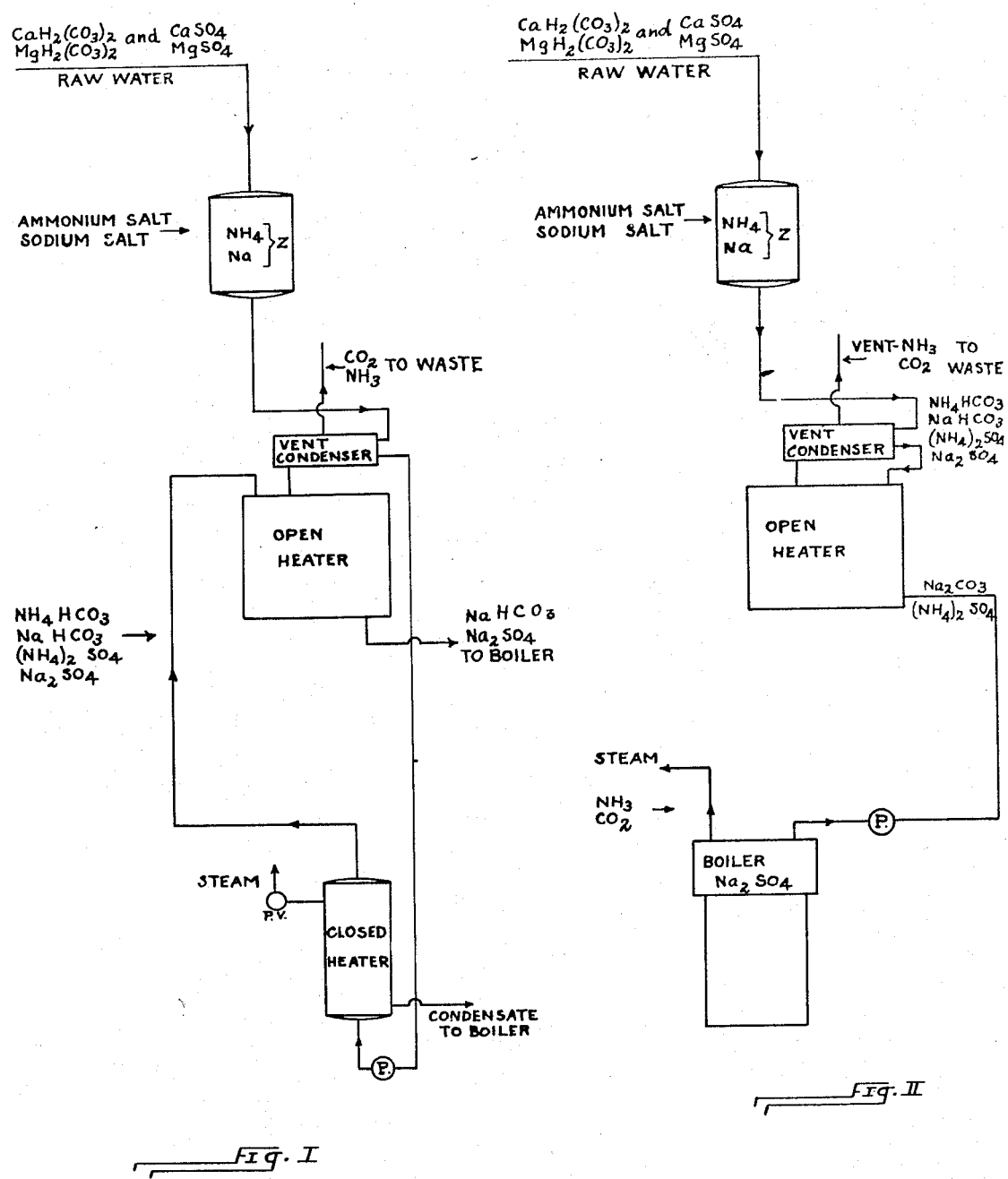
INVENTOR
Cyrus Wm. Rice
by Christy and Wharton
his attorneys Patented Dec. 7, 1937

2,101,197

UNITED STATES PATENT OFFICE 2,101,197

TREATMENT OF BOILER WATER

Cyrus W. Rice, Pittsburgh, Pa.

Application May 11, 1935, Serial No. 20,928

7 Claims. (Cl. 210—14)

This invention relates to the treatment of boiler feed water, and relates specifically to a treatment of boiler feed water which involves a water-softening step utilizing zeolites. A primary object of my invention is to provide a treatment in which the sulphate to carbonate ratio in water introduced into the boiler is so maintained as to inhibit boiler metal corrosion, to the extent that boiler corrosion is caused by excessive caustic concentrations, while conversely creating a sufficient reserve of alkaline salts in water passed to the boiler to counteract scale formations resulting through inleakage of scale-forming impurities, such, for example, as condenser leakage into the water as it passes to the boiler after treatment. More broadly expressed, this primary object of my invention is to provide a flexible method of treating boiler feed water, so that the resulting concentrations in the water have the value desired in accordance with boiler conditions, irrespective of the initial hardness content of the raw water.

Another object of my invention is to effect the purpose stated immediately above, while avoiding the necessity for pretreating or after-treating the boiler feed water subjected to a zeolite softening step. In conducting a zeolite softening treatment of boiler feed water in accordance with previous practice, certain additional treatments are requisite such as a preliminary lime treatment for the reduction of bicarbonate hardness, a treatment following the softening step for neutralizing excess sodium bicarbonate, an air agitating treatment for removing carbon dioxide, and a treating step involving the addition of sodium sulphate to the feed water for establishing and maintaining the suitable standard ratios in the water for inhibiting embrittlement.

Another object of my invention is to so treat boiler feed water in a bed of zeolites that the soluble salts contained in the water act in a common open type heater to increase the effectiveness of such a heater in removing corrosive gases from the feed water, thus avoiding in many installations the necessity for including costly deaerating heaters.

Another object of my invention is to provide a water-softening treatment of such nature that the soluble salt concentrations resulting from the treatment of a raw water of given hardness content are less than if the same raw water be treated for softening by the sodium zeolite treatment commonly employed.

Primarily, the objects of my invention are effected by reactivating and restoring the chemical efficiency of base exchange materials in zeolite water softeners with ammonium ($NH_4$) molecules and sodium (Na) molecules to regulate relatively the ratio or quantity of ammonium salts and sodium salts in the effluent from the zeolites, thus regulating the degree or quantity of bicarbonate and/or carbonate of sodium in the zeolite effluent. Additional specific objects obtained by my invention are, therefore, the regulation of the degree or quantity of sodium bicarbonate and carbonate in the effluent for the purpose of maintaining in the boiler water adequate hydroxide concentration to inhibit corrosion. Also the presence of ammonium molecules in the zeolite softeners serves, as indicated above, to limit the quantity of the bicarbonate and/or carbonate of sodium in the zeolite effluent, and to cause the inclusion in the effluent of soluble salts peculiarly susceptible to decomposition by heating.

In effecting my purpose I utilize, for reactivating and restoring the zeolites in manner to include the ammonium molecule and the sodium molecule therein, ammonium sulphate and/or ammonium chloride, desirably used as specially processed salts; together with sodium chloride and/or sodium sulphate. As a total these salts are proportioned to the predetermined carbonate hardness of the raw water, as almost inevitably present in the form of bicarbonates and the sulphate and/or chloride hardness present in the raw water, and with reference to the desired content of sodium bicarbonate that is to be maintained in the zeolite effluent. In explanation of the above, it may be noted that the hardness content of raw water is substantially in the form of the bicarbonates of calcium and magnesium and the sulphates of calcium and magnesium, attended possibly by some slight quantity of calcium chloride or magnesium chloride.

Before reactivating a bed of exhausted zeolites in a manner to apportion the ammonium and sodium radicals for inclusion therein, it is necessary to determine the extent or degree of the temporary hardness present in the raw water to be zeolitized, and to decide on the relative proportion of this temporary hardness which is to be converted and delivered to the effluent, respectively, as sodium bicarbonate and/or sodium carbonate, and, alternatively, as ammonium bicarbonate and/or ammonium carbonate. As will be hereinafter explained, any ammonium bicarbonate or ammonium carbonate present in the effluent, may be decomposed and wasted from the feed water in an open heater of common type, such as is commonly employed in boiler feed water systems. For this purpose, as a preliminary to the preparation of the zeolite, tests are made upon samples of raw water to determine the bicarbonate hardness (temporary hardness) of the water, and to determine the sulphate hardness (i. e. permanent hardness) of the water. Determination is also made of the carbonate to sulphate ratio, which should be carried in the boilers in accordance with good practice, such as that comprised in the A. S. M. E. code.

Assuming that a bed of zeolites has been made up to comprise zeolitic structures containing ammonium in base exchange positions, and zeolitic structures containing sodium in base exchange positions, the treatment of the boiler feed water proceeds in accordance with one or the other of the procedures shown in the accompanying flow diagrams constituting the drawing accompanying this specification.

In the accompanying drawing Fig. I is a flow diagram illustrating diagrammatically the conduct of my method of treating boiler feed water as conducted in a system comprising both an open heater and a closed heater.

Fig. II is a flow diagram illustrating diagrammatically the conduct of my method of treating boiler feed water in a system comprising an open heater only.

To describe the method generally, and without reference to the apportioned results obtainable by it, raw water containing calcium bicarbonate, calcium sulphate, and magnesium sulphate, is passed through a bed of zeolite comprising both ammonium-containing zeolites and sodium-containing zeolites. By reaction with the zeolites, the effluent water contains both ammonium bicarbonate, and sodium bicarbonate, and, also, both ammonium sulphate, and sodium sulphate. This general example disregards any possible presence of the chloride of calcium, or the chloride of magnesium.

From the zeolite treatment the effluent passes to a closed heater, desirably as shown by way of a vent condenser. In the closed heater the effluent water is raised to a temperature of not less than 212° F., and a pressure sufficient to pass it through the heater. The water in the closed heater is then flashed into an open heater which is maintained at such temperature, relative to that of the closed heater, as to secure a temperature gradient to effect flashing. The result of the heating is to cause a reaction between the sodium bicarbonate and ammonium sulphate in the water to produce sodium sulphate and ammonium bicarbonate. The purpose of flashing from the closed heater into the open heater is to accelerate this reaction.

In the open heater, the ammonium bicarbonate at that stage present in the water decomposes and volatilizes, escaping to the atmosphere, by way of the vent condenser, in the form of ammonia and carbon dioxide. It will be understood that, if ammonium carbonate is present as a result of the zeolite treatment, or is produced by reaction with sodium carbonate formed as a result of the zeolite treatment, this also decomposes and volatilizes from the open heater. The water passing to the boiler thus contains sodium bicarbonate and sodium sulphate.

Regardless of just what combinations the ammonium radical and sodium radical make with the bicarbonates and/or sulphates and/or chlorides in any water, the final result is the same after the effluent of the mixed zeolite softener is heated.

While I have described the conduct of my method in a treating system comprising both an open heater and a closed heater, as shown in the diagram of Fig. I, it is not wholly necessary that a closed heater be used, and the method may often, therefore, be conducted in a system as shown in Fig. II, comprising an open heater only. The reactions between the ammonium bicarbonate and sodium bicarbonate, and the sulphates of those radicals, which have been given above, can be completed within either an open heater of common type, within a heater of deaerating type, or within the boiler or steam generator itself. In either case, the ammonium sulphate is converted to sodium sulphate, and the ammonium bicarbonates, or ammonium carbonates, formed in the zeolite softening step, and through any reactions within or before the heater, are discharged to the atmosphere.

It should be noted that the decomposition of ammonium bicarbonate and/or ammonium carbonate in the open heater exerts a scrubbing effect on the water in the heater, which is of great assistance in freeing the water in the heater of dissolved oxygen. There are other advantages specifically to be attributed to the inclusion of the ammonium radical in the effluent from the zeolite softener. One such advantage is that ammonia, when liberated, exerts a beneficial effect by increasing the pH of the water and steam, thereby reducing corrosion in the equipment contacted thereby.

As is well known, the base exchange bodies known as zeolites, which are used for the softening treatment of water, are used in the form of small particles about the size of coarse sand. It is the surface of these particles which is effective, and the effective radical in each of the chemical structures at the surface of the zeolite particles is the radical in base exchange position. Beginning with a bed of base exchange bodies containing sodium in base exchange position in the chemical structure of the base exchange material, by the softening of hard water the sodium becomes exchanged for calcium and magnesium in the molecules at the surface of the bodies. With the mass, or bed, of base exchange material in this condition, I reactivate and restore the zeolite bed by washing it with a mixed solution of an ammonium salt and a sodium salt. In so doing I prefer to use the sulphate of ammonium and the chloride of sodium, thus partially replacing calcium and magnesium by ammonium in the base exchange bodies, and partially replacing calcium and magnesium by sodium in the base exchange bodies. The reaction products of calcium and magnesium pass from the bed of base exchange materials to waste.

It will be clear that the use of such a mixed solution causes the formation of a bed of base exchange bodies, in which ammonium and sodium may be apportioned in effective position at the surfaces of the bodies. This apportionment is in direct accordance with the relative proportion of the ammonium radical and the sodium radical in the reactivating and restoring solution.

In repetition: Before reactivating a bed of exhausted zeolites in a manner to apportion the ammonium and sodium radicals for inclusion therein, it is necessary to determine the extent or degree of the temporary hardness present in the raw water to be zeolitized, and to decide on the relative proportion of this temporary hardness which is to be converted and delivered to the effluent, respectively, as sodium bicarbonate and/or sodium carbonate, and alternatively, as ammonium bicarbonate and/or ammonium carbonate. As will be hereinafter explained, any ammonium bicarbonate or ammonium carbonate present in the effluent, may be decomposed and wasted from the feed water in an open heater of common type, such as is commonly employed in boiler feed water systems. For this purpose, as a preliminary to the preparation of the zeolite, tests are made upon samples of raw water to determine the bicarbonate hardness (temporary hardness) of the water, and to determine the sulphate hardness (i. e. permanent hardness) of the water. Determination is also made of the carbonate to sulphate ratio, which should be carried in the boilers in accordance with good practice, such as that comprised in the A. S. M. E. code.

Under the circumstances of the treatment, any raw water passing through a zeolite mass, which has been reactivated in the manner described, exchanges its various carbonate and sulphate hardnesses with the ammonium and sodium radicals presented in base exchange position on the zeolites, in proportion to the predetermined requirements, upon which basis the mass of zeolite material was reactivated. In order to illustrate the proportioning which results from the initial predetermined composition of the effective surfaces of the zeolites, and the subsequent heating of the effluent, the following example is given:

*Example.*—It will be assumed that the raw water contains 7 grains per gallon bicarbonate hardness (i. e. temporary hardness), in terms of calcium carbonate, and 3 grains of sulphate hardness (i. e. permanent hardness), in similar terms. It is also assumed that it is requisite to carry two grains of sodium bicarbonate hardness, in terms of calcium carbonate, in the zeolite effluent, for such purposes as have been mentioned. In such case, my solution for reactivating the zeolite mass will carry 5 sodium radicals to each 5 ammonium radicals.

These ammonium and sodium radicals being introduced in base exchange position in the zeolite mass, in the proportions given, the raw water containing 7 grains per gallon bicarbonate hardness, in terms of calcium carbonate, and 3 grains per gallon sulphate hardness, in terms of calcium carbonate, is passed through the mass of base exchange bodies. It can only exchange with the radicals which are presented in base exchange position, at the surface of the zeolite bodies, until these radicals are exhausted. The resulting effluent, therefore, must carry the ammonium and sodium radicals in proportion to the predetermined quantities of these radicals used for reactivating the zeolites.

Under such conditions, the effluent from the zeolite mass, or bed, contains compounds of ammonium and sodium in the ratio of 5 ammonium ($NH_4$) radicals to 5 sodium (Na) radicals. Whether these radicals are tied up in sodium bicarbonates and/or carbonates, or sulphates, or whether they are tied up as ammonium bicarbonates and/or carbonates, or sulphates, the net result after the water passes through the open heater, is to deliver to the boiler a water containing proportionally two molecules of sodium bicarbonate or sodium carbonate to each three molecules of sodium sulphate, both in terms of calcium carbonate. The ammonium salts resulting from reaction in the zeolite mass, and by subsequent reaction, are decomposed either entirely or almost entirely in the heater, and are passed to waste, in accordance with the effectiveness of the heater. The reactions for this proportional example are as follows:—

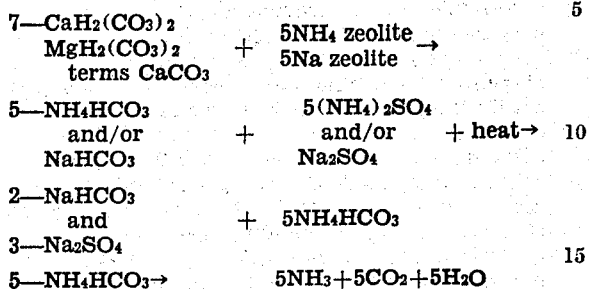

It will be noted that these reactions illustrate the progress of the treatment throughout the system, and also that they are consistent with the reactions explained in terms above, and as shown in the flow diagrams of Figs. I and II.

The gist of the method is thus that the ammonium radical is eliminated, carrying with it such proportion of the temporary hardness radical (i. e. the carbonate radical), as is represented by the ratio of ammonium radical introduced into the zeolite mass, or bed, leaving so much of the carbonate radical as is not represented by the ammonium introduced into the zeolites, and, therefore, is present in the effluent in the form of sodium bicarbonate and/or sodium carbonate.

The chloride radical, if any trace of this be present, as combined with calcium or magnesium, constitutes permanent hardness. If it be present, therefore, allowance is made for it in computing the ratio of sulphate to carbonate desired in the water passed to the boiler. The chlorides forming a part of the permanent hardness content of the raw water, if they be present, are, therefore, added quantitatively to the sulphates in computing permanent hardness. As passed to the boiler, the effect of sodium chloride carried in the effluent is directly analogous to the effect of sodium sulphate.

I prefer to use as my reactivating reagents ammonium sulphate and sodium chloride, because of the fact that these reagents are wholly satisfactory and are available in bulk at very low cost. It has been noted that the chloride of ammonium and the sulphate of sodium may likewise be used. It should further be explained that any other highly soluble salt of both ammonium and sodium, such, for example, as ammonium nitrate and sodium nitrate, may be used to effect the introduction of ammonium and sodium into the base exchange bodies of the zeolite mass, or bed, in reactivating the zeolites.

If it be desired to carry some proportion of ammonium sulphate into the boiler, this may be done by so regulating the heater, or heaters, of the system that not all the ammonium sulphate in the effluent is converted into ammonium bicarbonate and/or carbonate. As ammonium sulphate is on the acid side, its inclusion in small quantity tends to lower the pH value in the boiler. Obviously ammonium sulphate is also carried to the boiler if the zeolite bed is so reactivated that the ammonium radical is included therein in a ratio greater than the ratio of temporary hardness to permanent hardness in the raw water, rather than in a ratio equal to or less than the ratio of temporary hardness to permanent hardness in the raw water.

It should be borne in mind that the apportionment is initiated in the mixed zeolite bed, comprising ammonium containing base exchange bodies and sodium containing base exchange bodies in predetermined ratio. This introduces the factors which render the ratios in the effluent susceptible to subsequent control merely by passage through the heater, or heaters. It is of course implicit in the process that calcium and magnesium are eliminated from the water. It is with the character of the water as it exists freed of calcium and magnesium that my invention specifically deals. As, therefore, the terms "temporary hardness radical" and "permanent hardness radical" are used throughout the claims, they are to be understood as defining, respectively, those radicals which combine with calcium and magnesium to produce temporary hardness, and those radicals which combine with calcium and magnesium to produce permanent hardness, and do not define calcium and magnesium themselves. Also, potassium being the full typical reactive equivalent of sodium, potassium is to be read alternatively for sodium in each instance in which the term "sodium" is used in the specification and claims.

I claim as my invention:

1. In the softening of a flowing stream of water the herein described method of controlling the relative retention in the water of radicals combinable to produce temporary hardness and those combinable to produce permanent hardness, which comprises determining the relative proportion of temporary hardness compounds and permanent hardness compounds in the raw water, regenerating a zeolite bed with ammonium and sodium containing reagents causing inclusion of both ammonium radical and sodium radical in the zeolite bodies while apportioning the reagents to cause relative inclusion of the ammonium radical with respect to the sodium radical in a ratio based upon the relative content of temporary hardness forming radicals and permanent hardness forming radicals in the raw water and predetermined with respect to the extent to which it is desired to eliminate the temporary hardness forming radicals from the water, passing raw water through said zeolite bed and thereby causing inclusion of ammonium and sodium radicals in the effluent in the ratio in which they are present in the zeolite bed, heating the effluent to thereby cause combination of approximately the entire content of ammonium radical with temporary hardness forming radicals and thereby to decompose ammonium compounds, and venting the products of such decomposition from the effluent while retaining in the effluent the sodium radical and hardness forming radicals to the extent that they are combined with the sodium radical.

2. In the softening of a flowing stream of water the herein described method of eliminating from the water radicals combinable to produce temporary hardness which comprises determining the relative proportions of temporary hardness compounds and permanent hardness compounds in the raw water, regenerating a zeolite bed with ammonium and sodium containing reagents causing inclusion of both ammonium radical and sodium radical in the zeolite bodies while apportioning the reagents to cause relative inclusion of ammonium radical to sodium radical in approximate proportion to the ratio of temporary hardness forming radicals to permanent hardness forming radicals in the raw water, by passing raw water through said zeolite bed causing inclusion of ammonium and sodium radicals in the effluent in the ratio in which they are present in the zeolite bed, heating the effluent and thereby causing combination of approximately the entire content of ammonium radical with temporary hardness forming radicals and decomposition of the ammonium compounds thus formed, and venting from the effluent such decomposition products of the ammonium compounds comprising temporary hardness forming radicals while retaining in the effluent the sodium radical and the permanent hardness forming radicals.

3. The herein described regenerating step in the maintenance of a zeolite water-softening bed, which comprises determining the relation of temporary hardness compounds to permanent hardness compounds in the raw water to be softened, and in reactivation of the zeolite bed exhausted by water softening by treating it with a mixture of an ammonium compound and a sodium compound, in such proportion that the ammonium radical and the sodium radical are introduced into the zeolite bed in direct proportion to the relation between the temporary hardness content of the raw water and the permanent hardness content of the raw water.

4. A water-softening bed of zeolites for the apportioned removal of temporary hardness-forming radicals from raw water which bed of zeolites contains both ammonium and sodium in an effective position in the zeolite bodies, and in a ratio of ammonium radicals to sodium radicals predetermined on the basis of a determined ratio of temporary hardness compounds to permanent hardness compounds in a raw water to be treated, whereby the zeolite bed produces an effluent containing such proportion of ammonium radical and sodium radical that by heating with consequent approximately total combination of temporary hardness-forming radicals with the ammonium radical and decomposition of such ammonium compounds the temporary hardness-forming radicals may in predetermined degree be eliminated from the water.

5. The herein described step in a method of treating boiler feed water for the approximately total removal of temporary hardness-forming radicals therefrom, which consists in passing the raw water through a zeolite bed containing in effective position in the zeolite bodies ammonium radical and sodium radical in a ratio of ammonium to sodium at least equal to the ratio of calcium and magnesium combined with carbonates and bicarbonates in the water to calcium and magnesium combined as sulphates and chlorides in the water to produce an effluent containing ammonium radical and sodium radical in a ratio at least equal to the ratio of temporary hardness-forming radicals to permanent hardness-forming radicals in the raw water; whereby the effluent is rendered susceptible to an approximately total combination of temporary hardness-forming radicals with the ammonium radical and to decomposition of such ammonium compounds wholly to eliminate the temporary hardness-forming radicals from the water by heating.

6. A water-softening bed of zeolites for the substantially complete removal of temporary hardness-forming radicals from raw water which bed of zeolites contains both ammonium and sodium in an effective position in the zeolite bodies, and in a ratio of ammonium radical to sodium radical at least equal to the ratio of temporary hardness compounds to permanent hardness compounds in the raw water to be treated; whereby the zeolite bed produces an effluent containing such proportion of ammonium radical to sodium radical that by heating with consequent approximately total combination of temporary hardness radicals with the ammonium radical and decomposition of such ammonium compounds the temporary hardness-forming radicals may in predetermined degree be eliminated from the water.

7. In the softening of a flowing stream of water the herein described method of controlling the relative retention in the water of radicals combinable to produce temporary hardness and those combinable to produce permanent hardness, which comprises determining the relative proportions of temporary hardness compounds and permanent hardness compounds in the raw water, in regenerating a zeolite bed treating it with ammonium and sodium containing with reagents to thereby cause inclusion of both ammonium radical and sodium radical in the zeolite bodies while apportioning the reagents to cause relative inclusion of the ammonium radical with respect to the sodium radical in a ratio based upon the relative content of temporary hardness forming radicals and permanent hardness forming radicals in the raw water and predetermined with respect to the extent to which it is desired to eliminate the temporary hardness forming radicals from the water, passing raw water through said zeolite bed to thereby cause inclusion of ammonium and sodium radicals in the effluent in the ratio in which they are present in the zeolite bed, heating the said water produced as an effluent from the zeolite bed thereby to decompose in the effluent ammonium compounds comprising temporary hardness forming radicals, and venting the products of such decomposition.

CYRUS WM. RICE.